(12) United States Patent
VanBlon et al.

(10) Patent No.: US 10,592,096 B2
(45) Date of Patent: Mar. 17, 2020

(54) CURSOR INDICATOR FOR OVERLAY INPUT APPLICATIONS

(71) Applicant: Lenovo (Singapore) Pte. Ltd., Singapore (SG)

(72) Inventors: Russell Speight VanBlon, Raleigh, NC (US); Steven Richard Perrin, Raleigh, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 14/580,358

(22) Filed: Dec. 23, 2014

(65) Prior Publication Data

US 2016/0179363 A1    Jun. 23, 2016

(51) Int. Cl.
*G06F 3/0488*  (2013.01)
*G06F 3/0481*  (2013.01)
*G06F 17/24*   (2006.01)

(52) U.S. Cl.
CPC ...... *G06F 3/04883* (2013.01); *G06F 3/04812* (2013.01); *G06F 17/243* (2013.01)

(58) Field of Classification Search
None
See application file for complete search history.

(56) References Cited

U.S. PATENT DOCUMENTS

| | | | | |
|---|---|---|---|---|
| 6,826,413 | B1* | 11/2004 | Nakatsuchi | H04M 1/72525 455/553.1 |
| 7,743,339 | B1* | 6/2010 | Chanda | G06F 9/451 715/804 |
| 7,825,896 | B2* | 11/2010 | Yoshida | G06F 3/038 715/856 |
| 2004/0135819 | A1* | 7/2004 | Maa | G06F 3/0481 715/840 |
| 2006/0112349 | A1* | 5/2006 | Clow | G06F 3/0481 715/780 |
| 2016/0170601 | A1* | 6/2016 | Kaprani | G06F 17/243 715/856 |

* cited by examiner

*Primary Examiner* — Nhat Huy T Nguyen
(74) *Attorney, Agent, or Firm* — Ference & Associates LLC

(57) ABSTRACT

One embodiment a method, including: providing, on an input and display device, an overlay handwriting input application that provides handwriting input to an underlying application; and providing, on the input and display device, a cursor initiated by the overlay handwriting application that represents an input location within at least one input field of the underlying application. Other embodiments are described and claimed.

20 Claims, 4 Drawing Sheets

US 10,592,096 B2

CURSOR INDICATOR FOR OVERLAY INPUT APPLICATIONS

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of unconverted handwriting input may be placed into an underlying application, e.g., an image of the user's signature.

BRIEF SUMMARY

In summary, a method, comprising: providing, on an input and display device, an overlay handwriting input application that provides handwriting input to an underlying application; and providing, on the input and display device, a cursor initiated by the overlay handwriting application that represents an input location within at least one input field of the underlying application.

Another aspect provides an electronic device, comprising: an input and display device; a processor; a memory that stores instructions executable by the processor to: provide, on the input and display device, an overlay handwriting input application that provides handwriting input to an underlying application; and provide, on the input and display device, a cursor initiated by the overlay handwriting application that represents an input location within at least one input field of the underlying application.

A further aspect provides a product, comprising: a storage device having code stored therewith, the code being executable by a processor and comprising: code that provides, on an input and display device, an overlay handwriting input application that provides handwriting input to an underlying application; and code that provides, on the input and display device, a cursor initiated by the overlay handwriting application that represents an input location within at least one input field of the underlying application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
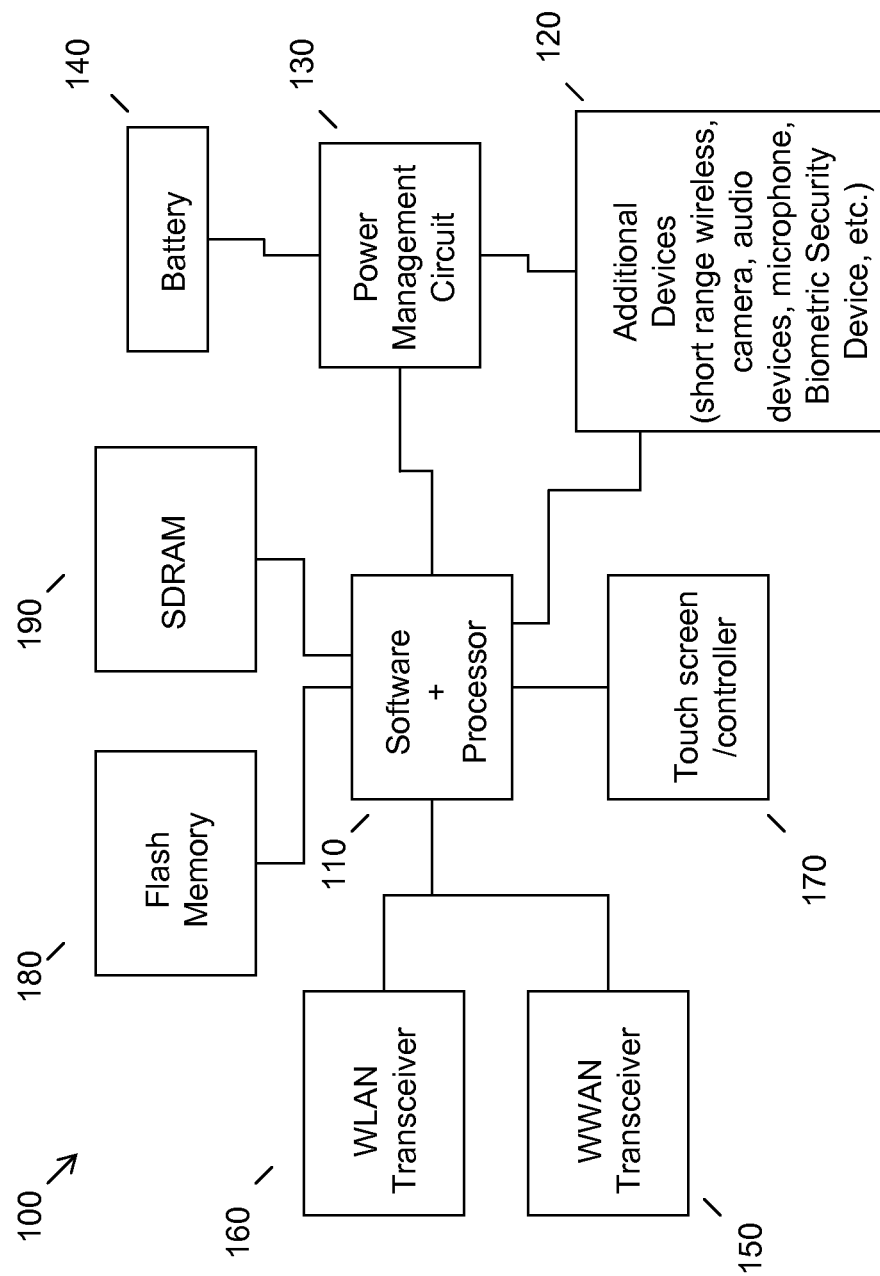
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In an underlying application (e.g., fillable web browser form, email application, fillable portable document format (PDF) document, etc.) a cursor position in an active text field will be shown (displayed) such that the user is apprised of the location into which new text or image/graphic input will be inserted. However, when the underlying field is not active or is not focused (e.g., touched, clicked on, etc.) the underlying application does not display the cursor location for the unfocused field(s). This is based on the assumption that the user will not need to know the cursor location when the field is not active or is unfocused, as field activation is required to provide native input.

However, in overlay applications, e.g., an overlay application that accepts handwriting input and converts the ink strokes to machine input (machine text for typeset) or inserts an image or graphic of the ink strokes for an underlying application, field activation may occur post input. That is, a user may choose to enter handwriting into the overlay application prior to selecting or activating the particular input field in question. While the user may always activate the input field prior to providing the handwriting input, this is sometimes inconvenient and in any event may be difficult for the user to remember each time.

Moreover, even when the input field of the underlying application is active, it is possible to inadvertently change the cursor position, e.g., by inadvertent contact with a touch screen. This inadvertent change to the underlying cursor position occurs more frequently in the overlay application context.

Accordingly, an embodiment provides an input field overlay to an underlying application's input field where, when the overlay input field receives handwriting stroke input (e.g., pen or finger input), an embodiment calls a native API to determine where the cursor is within the associated underlying field. Although the field of the underlying application may be unfocused (not activated) and thus the application's cursor is not actively displayed when the ink strokes are received by the input field overlay application, the cursor position is stored by the underlying application and may be retrieved by an embodiment.

Using the cursor position data, an embodiment displays an overlay cursor that indicates to the user where the handwriting strokes will be inserted within existing typeset text. The overlay cursor may be displayed or provided in a variety of ways. For example, the overlay cursor may only appear for inactive/unfocused text fields. The overlay cursor may appear continuously (all the time) for only the active text field, or the overlay cursor may only appear for a text field where the user is actively writing. Additionally, the overlay cursor may appear all the time for all text fields. The overlay cursor also may only appear for text fields with existing typeset text in them since the problem is lesser if there is no text in the field (i.e., there is only one possible location for handwriting stroke input insertion). A user may configure when and how many overlay cursor(s) are to be displayed by or in connection with the overlay application.

Note that the exact appearance of the overlay cursor may vary. For example, an overlay cursor may be displayed as identical to the standard built-in cursor of the underlying application, but drawn by the overlay application, e.g., in alternative (inactive) fields. In this case, the user may not know that the overlay application is providing the overlay cursor, as there is no visual difference. Alternatively, an overlay cursor may be displayed that appears as intentionally different or distinguishable from the standard built-in cursor of the underlying application. This different appearance indicates to a user that the overlay cursor is being presented by the overlay application and not the underlying application. A combination of the foregoing may be utilized, e.g., at the same time visually different overlay cursors may be displayed. The appearance of the overlay cursor may be, for example, a colored bar, larger or smaller than the standard cursor of the underlying application, etc.

In an embodiment, the overlay application animates the overlay cursor or cursors. However, in an embodiment, a modified text field control may be used to force the display of the built in cursor of the underlying application as the overlay cursor. In other words, an embodiment may force the underlying application to present its cursor even when the underlying field is not active or focused. This may require modification of the built-in text field of the underlying application. For example, the text field control of the underlying application may be modified so that it always displays the cursor even when the field is unfocused. Or, the text field control may show the cursor when it is receiving associated ink input even if it were previously unfocused (assuming pen input is supported by the underlying application's text field).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
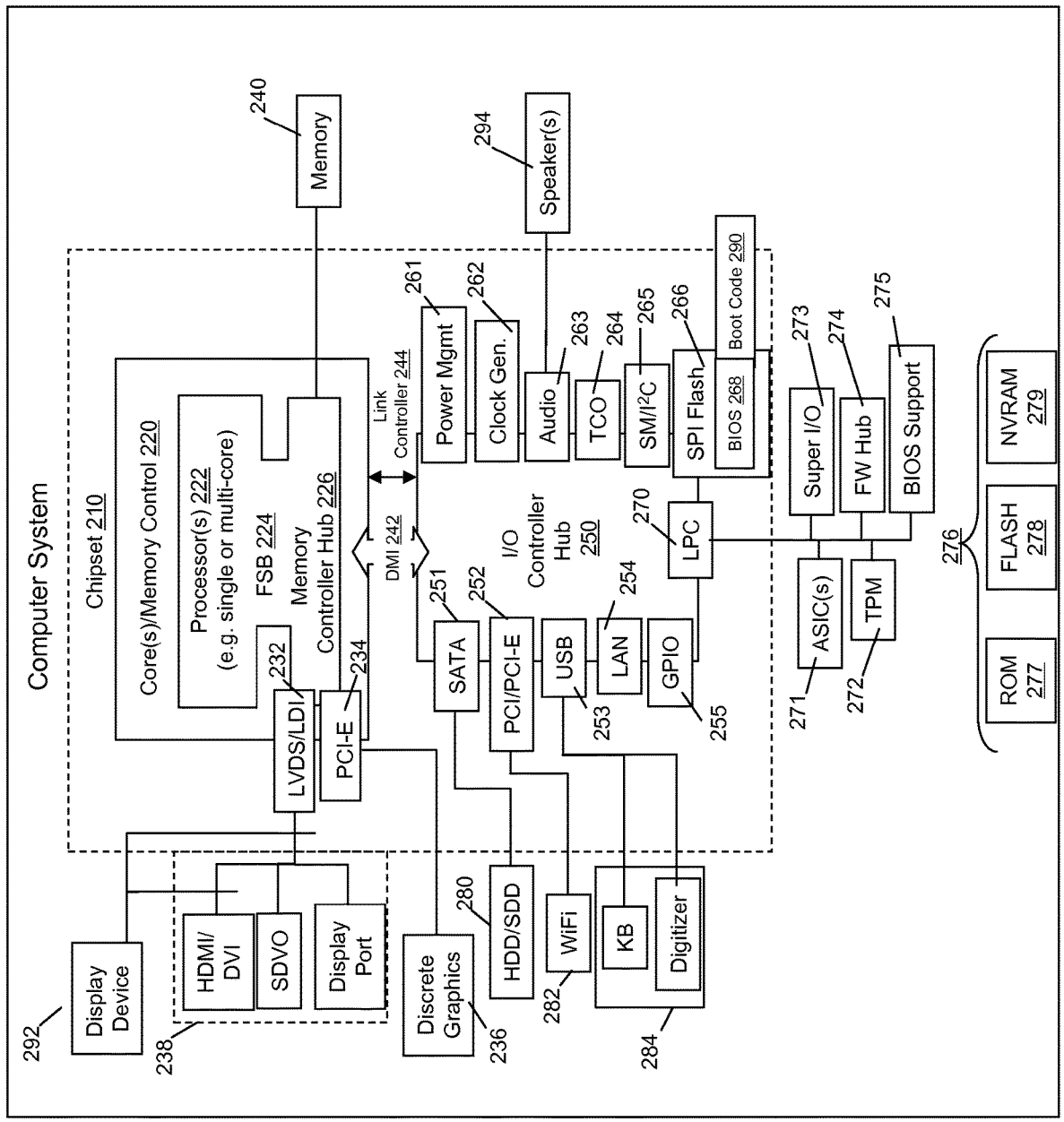
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices such as payment kiosks, etc. Users may employ these devices for various functions, e.g., inputting handwriting strokes as an input modality to an Internet search application, an email application, a text messaging or instant messaging application, an e-signature application, fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes and provides visual displays of input characters, converts handwritten characters or strokes to machine text, provides of an input field overlay for an underlying input field, etc.

As described herein, a lack of an appropriate indicator of cursor location (cursor display) is a problem, particularly in the context of using an overlay handwriting input application. By way of non-limiting example, a user may provide handwriting input to an overly handwriting input application implemented on a touch screen prior to selecting or focusing the underlying input field (e.g., text input field). That is, the destination for the handwriting input provided to overlay application may not be indicated until after the handwriting input is actually received and converted to machine input. As such, the user is not conventionally aware of the cursor location within the unfocused, underlying field. This may be problematic if there is already (previously entered) text in the field because the user's additional input may not be appropriately tailored for insertion in the current cursor location.

Figure 3B:
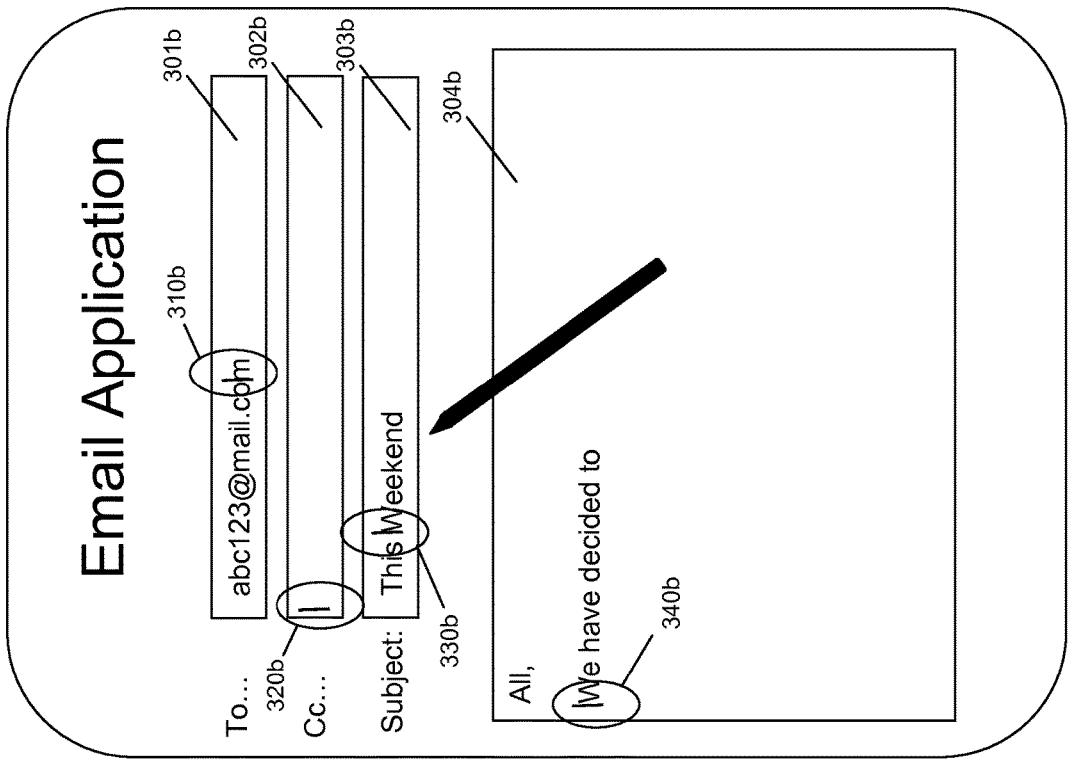
FIG. 3(A-B) illustrates examples of unfocused input fields and indicating cursor locations thereof.
Figure 3A:
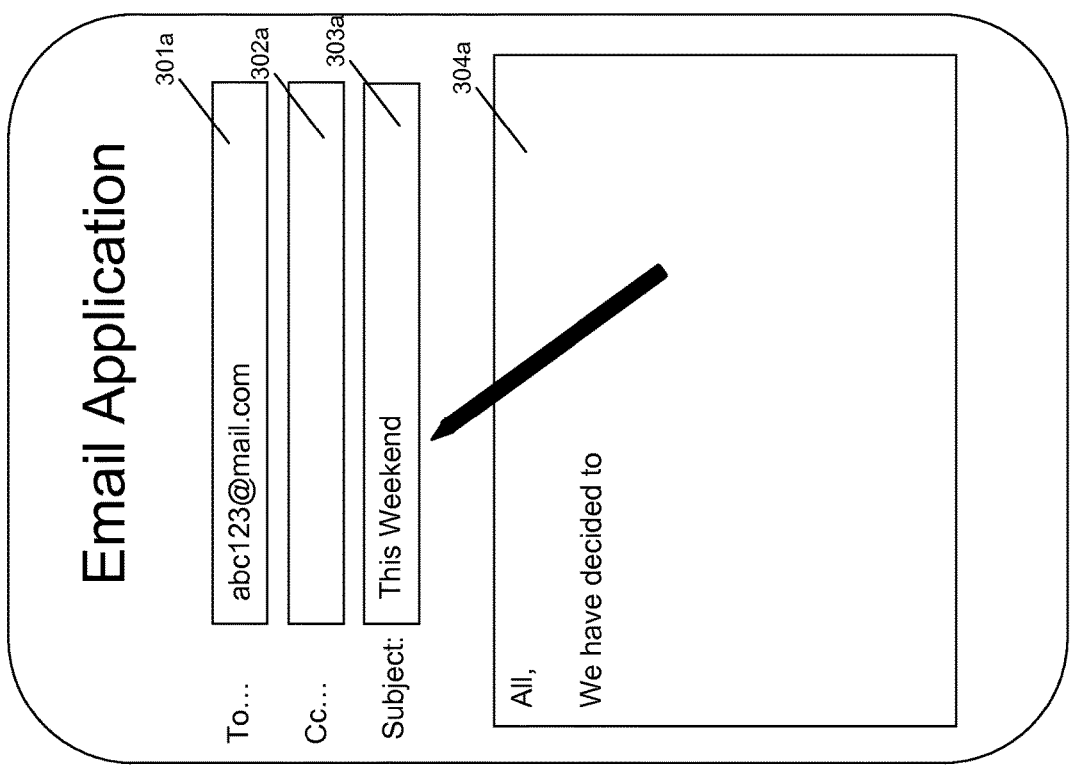

Referring to FIG. 3A a visual example scenario is illustrated. In FIG. 3A, a user may be in the midst of providing handwriting input to a touch screen email application. For example, the user has entered in "abc123@mail.com" for the "To" underlying application field 301a, has not entered any input for the underlying "Cc" field 302a, has entered "This Weekend" into the "Subject" field 303a, and in the body or message field 304a has partially composed an email message.

If the user goes to provide further inputs, e.g., addition of another email address in the "To" field 301a, additional input for the subject 303a or body fields 304a, etc., the user may not have activated or focused a particular field. Inactivation of a last active field may result, e.g., from the user removing the pen or stylus a predetermined distance from the touch screen for a predetermined time. If the user does not explicitly click within or otherwise activate/focus a field, the underlying application will not display a cursor location for any of the fields, as illustrated in FIG. 3A.

An embodiment therefore provides an overlay input application that displays cursor location(s) for the underlying application input fields, as illustrated in FIG. 3B. In the illustrated example, prior to the user focusing any of 301b, 302b, 303b or 304b, an embodiment provides overlay cursors at positions 310b, 320b, 330b and/or 340b. Again these may be animated by the overlay application and/or force-displayed by the underlying application. It is noted that while all underlying fields are presented with overlay cursors in FIG. 3B, this is an illustrative example only and fewer than all may be displayed.

As shown in FIG. 3B, the provision of overlay cursors at positions 310b, 320b, 330b, and 340b apprises the user of where the underlying email application will insert text if that particular field is focused. As may be appreciated from this example, the cursor location within the underlying field may not be what the user expects. For example, in field 302b, since there is no text, a user may well be aware that the cursor is left justified. In contrast, however, the user may not know that the last active position for the cursor of field 301b is mid-text, i.e., at position 310b, and likewise may not have noticed that the user left the cursor in field 304b at the beginning of the text, i.e., at position 340b.

Figure 4:
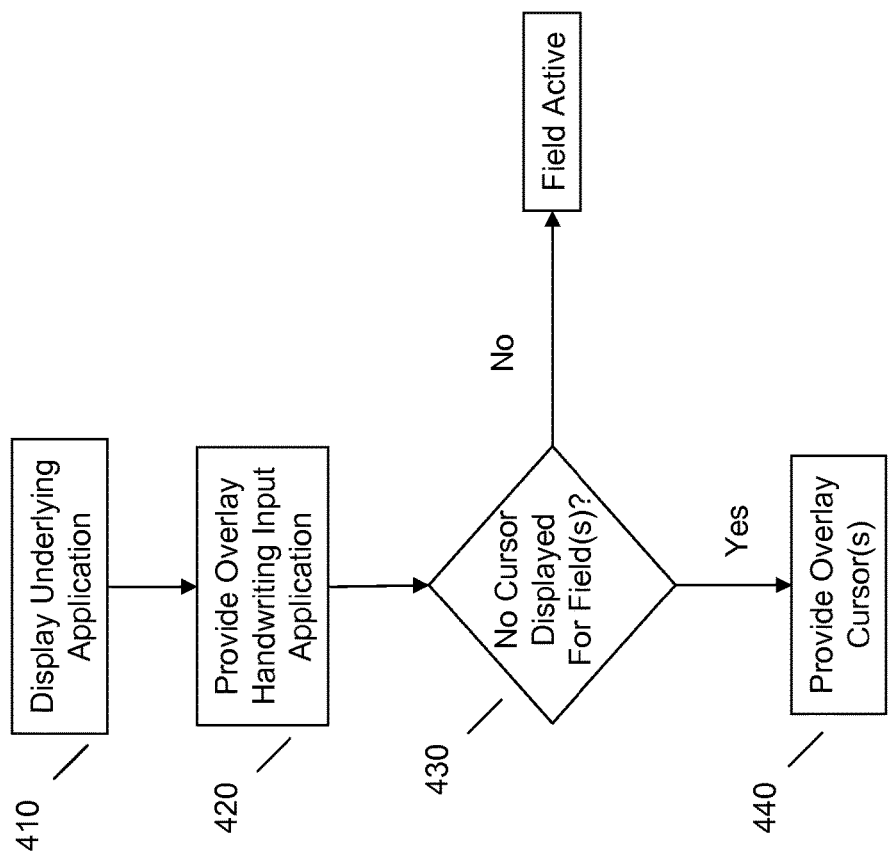
FIG. 4 illustrates an example method of providing a cursor indicator in connection with use of an overlay input application.

Accordingly, an embodiment provides an overlay cursor for use in connection with a handwriting input application. By way of example, and referring to FIG. 4, an embodiment displays at 410, e.g., on a display device such as a touch screen, an underlying application. That is, the displayed underlying application includes fields to which the user may provide input (e.g., email application, web document, PDF type document, etc.).

An embodiment also provides at 420 an overlay handwriting input application, e.g., that converts handwriting input into machine input for the underlying application. This overlay handwriting input application allows for the input of handwriting strokes, by way of example, that are converted to another format, e.g., usable by the underlying application as input. As described herein, a user may provide the handwriting input prior to selecting any particular underlying input field or may switch the underlying input field into which the converted handwriting input is placed using the overlay handwriting input application.

Therefore, an embodiment detects at 430 if there is no cursor displayed for one or more of the underlying input fields of the underlying application. For example, an embodiment may detect at 430 that one or more unfocused input fields is/are provided by the underlying application. The unfocused input field may be the only input field or may be one of many input fields. An unfocused input field may be detected while an active input field is also detected.

Thus, an embodiment may detect that input field(s) are present in the underlying application but no cursor position is active for those input field(s). An embodiment therefore may determine at 430 that one or more input fields lack a cursor display. As there are one or more input fields to which a user's handwriting input might be directed, yet no current cursor position is displayed by the underlying application for those input fields, an embodiment provides an overlay cursor representing the cursor location(s) at 440. Of course, for an activated field, the cursor may already be displayed.

Providing an overlay cursor conveniently notifies the user of where the handwriting input will be placed upon entry into a given underlying input field. This assists the user by providing a visual indication of the current cursor location for input field(s) such that the user may appropriately tailor the handwriting input.

In an embodiment, a cursor position is obtained from the underlying application with respect to the at least one input field lacking a displayed cursor. In this case, the overlay cursor may be animated by the overlay handwriting input application. That is, the overlay handwriting input application may provide the overlay cursor at 440 by independently creating a visual cursor and outputting this data for display. As the overlay application is generating the overlay cursor in this case, the overlay cursor may be chosen as visually distinguishable from a standard cursor visual display of the underlying application. This may prove useful, e.g., in the instance where multiple overlay cursors are to be provided. For example, the at least one input field having no cursor location visually indicated may in fact include a plurality of input fields having no cursor locations indicated. In this case, a plurality of overlay cursors of different visual appearance may be provided. At least one of the plurality of overlay cursors may be visually distinguishable from a standard cursor visual display of the underlying application. This may be employed, for example, in a case where the underlying application is displaying a cursor for an active input field, but the user wishes to view other cursor locations for inactive input fields.

In an embodiment, providing an overlay cursor representing the cursor location at 440 may include instructing the underlying application to display a cursor location. For example, the instructing may include modifying a field control of the underlying application, e.g., indicating the inactive input field is active prior to activating input being received therewith. In this case, the displayed cursor will naturally be produced by the underlying application, which dictates its appearance.

In view of the foregoing, it will be appreciated that the various embodiments represent technical improvements to the way in which input fields are visually rendered. Embodiments make it possible for the user to keep track of cursor location(s) for input fields, even while using an overlay handwriting input application. Among other things, this assists the user in forming handwriting inputs that are customized to the insertion points within the input fields.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
providing, on an input and display device, an overlay handwriting input application that provides handwriting input to an underlying application;
identifying cursor position data, wherein the cursor position data indicates at least one of: a position of a cursor within an input field of the underlying application and at least one input field of the underlying application having no underlying application cursor; and
providing, on the input and display device, an overlay cursor separate and distinct in appearance from the cursor within the underlying application and initiated by and provided within the overlay handwriting application;
wherein, when the position of a cursor within an input field of the underlying application is identified, the overlay cursor indicates an input location where handwriting input provided within the overlay handwriting application will be provided within the input field of the underlying application and wherein the input location is identified from the cursor position data; and
wherein, when at least one input field of the underlying application has no underlying application cursor, the overlay cursor is provided within the at least one input field of the underlying application not having an underlying application cursor and indicates that handwriting input provided within the overlay handwriting application will be provided within the at least one input field.

2. The method of claim 1, further comprising obtaining a cursor location within the at least one input field, wherein the cursor is animated by the overlay handwriting input application.

3. The method of claim 2, wherein the cursor is visually distinguishable from a standard cursor visual display of the underlying application.

4. The method of claim 2, wherein:
the at least one input field comprises a plurality of input fields; and
the cursor comprises a plurality of cursors.

5. The method of claim 4, wherein at least one of the plurality of cursors is visually distinguishable from a standard cursor visual display of the underlying application.

6. The method of claim 1, wherein the at least one input field has no cursor location visually indicated and contains text.

7. The method of claim 1, wherein the providing a cursor comprises instructing the underlying application to display a cursor.

8. The method of claim 7, wherein said instructing comprises modifying a field control of the underlying application.

9. The method of claim 8, wherein said field control comprises indicating at least one unfocused input field is active.

10. The method of claim 1, wherein the at least one unfocused input field is a text input field.

11. An electronic device, comprising:
an input and display device;
a processor;
a memory that stores instructions executable by the processor to:
provide, on the input and display device, an overlay handwriting input application that provides handwriting input to an underlying application;
identify cursor position data, wherein the cursor position data indicates at least one of: a position of a cursor within an input field of the underlying application and at least one input field of the underlying application having no underlying application cursor; and
provide, on the input and display device, an overlay cursor separate and distinct in appearance from the cursor within the underlying application and initiated by and provided within the overlay handwriting application;
wherein, when the position of a cursor within an input field of the underlying application is identified, the overlay cursor indicates an input location where handwriting input provided within the overlay handwriting application will be provided within the input field of the underlying application and wherein the input location is identified from the cursor position data; and
wherein, when at least one input field of the underlying application has no underlying application cursor, the overlay cursor is provided within the at least one input field of the underlying application not having an underlying application cursor and indicates that handwriting input provided within the overlay handwriting application will be provided within the at least one input field.

12. The electronic device of claim 11, wherein the instructions are executable by the processor to obtain a cursor location within the at least one input field, wherein the cursor is animated by the overlay handwriting input application.

13. The electronic device of claim 12, wherein the cursor is visually distinguishable from a standard cursor visual display of the underlying application.

14. The electronic device of claim 12, wherein:
the at least one input field comprises a plurality of input fields; and
the cursor comprises a plurality of cursors.

15. The electronic device of claim 14, wherein at least one of the plurality of cursors is visually distinguishable from a standard cursor visual display of the underlying application.

16. The electronic device of claim 11, wherein the at least one input field has no cursor location visually indicated and contains text.

17. The electronic device of claim 11, wherein to provide a cursor comprises instructing the underlying application to display a cursor.

18. The electronic device of claim 17, wherein said instructing comprises modifying a field control of the underlying application.

19. The electronic device of claim 18, wherein said field control comprises indicating at least one unfocused input field is active.

20. A product, comprising:
a non-signal storage device having code stored therewith, the code being executable by a processor and comprising:
code that provides, on an input and display device, an overlay handwriting input application that provides handwriting input to an underlying application;
code that identifies cursor position data, wherein the cursor position data indicates at least one of: a position of a cursor within an input field of the underlying application and at least one input field of the underlying application having no underlying application cursor; and
code that provides, on the input and display device, an overlay cursor separate and distinct in appearance from the cursor within the underlying application and initiated by and provided within the overlay handwriting application;

wherein, when the position of a cursor within an input field of the underlying application is identified, the overlay cursor indicates an input location where handwriting input provided within the overlay handwriting application will be provided within the input field of the underlying application and wherein the input location is identified from the cursor position data; and wherein, when at least one input field of the underlying application has no underlying application cursor, the overlay cursor is provided within the at least one input field of the underlying application not having an underlying application cursor and indicates that handwriting input provided within the overlay handwriting application will be provided within the at least one input field.

* * * * *